United States Patent
Deng et al.

(10) Patent No.: US 10,860,822 B2
(45) Date of Patent: Dec. 8, 2020

(54) TEMPERATURE-MEASURING SCAN HEAD AND ITS USE METHOD

(71) Applicant: Shenzhen iData Technology Company Ltd., Shenzhen (CN)

(72) Inventors: Zhenhua Deng, Chenjianzuo (CN); Jiangtao Wei, Shenzhen (CN); Chao He, Nancun (CN); Zhenxi Wang, Shenzhen (CN)

(73) Assignee: Shenzhen iData Technology Company Ltd., Shenzhen (CN)

( * ) Notice: Subject to any disclaimer, the term of this patent is extended or adjusted under 35 U.S.C. 154(b) by 0 days.

(21) Appl. No.: 15/743,241

(22) PCT Filed: Nov. 4, 2016

(86) PCT No.: PCT/CN2016/104626
§ 371 (c)(1),
(2) Date: Jan. 9, 2018

(87) PCT Pub. No.: WO2018/082019
PCT Pub. Date: May 11, 2018

(65) Prior Publication Data
US 2020/0089925 A1  Mar. 19, 2020

(51) Int. Cl.
*G06K 7/10* (2006.01)
*G01K 13/00* (2006.01)

(52) U.S. Cl.
CPC ....... *G06K 7/10881* (2013.01); *G01K 13/002* (2013.01); *G06K 7/10851* (2013.01)

(58) Field of Classification Search
CPC .......... G06K 7/10881; G06K 7/10851; G06K 7/10722
USPC ..................................... 235/462.45
See application file for complete search history.

(56) References Cited

U.S. PATENT DOCUMENTS

| | | | | |
|---|---|---|---|---|
| 5,334,826 A | * | 8/1994 | Sato | H01S 5/0021 235/455 |
| 5,844,928 A | * | 12/1998 | Shastri | H01S 5/06804 372/38.02 |
| 6,123,263 A | * | 9/2000 | Feng | G06K 7/10732 235/462.42 |
| 2005/0101250 A1 | * | 5/2005 | Helal | A61B 5/0062 455/41.2 |
| 2008/0277480 A1 | * | 11/2008 | Thuries | G02B 3/14 235/472.01 |

(Continued)

*Primary Examiner* — Ahshik Kim
(74) *Attorney, Agent, or Firm* — Reine Rooney LLC

(57) ABSTRACT

This invention discloses a temperature-measuring scan head, comprising an enclosure, and its use method. There are supplementary lamp, image sensor and temperature sensor embedded on the end surface of the enclosure. The present scan head is as small as the existing scan heads on the market, but it has high-precision temperature sensor with built-in temperature-calibration module that promises temperature information collection and accurate temperature measurement. Technically, the operator should use the scan head to scan the barcode of the objects or living things to be measured, and the scan head will read identity information and conduct temperature measurement. As such, temperature of the objects or living things corresponds to their respective identity, thereby guaranteeing the accuracy of data.

3 Claims, 2 Drawing Sheets

(56) References Cited

U.S. PATENT DOCUMENTS

2013/0108510 A1\* 5/2013 Takeuchi ........... G01N 27/3273
  422/82.12

\* cited by examiner

TEMPERATURE-MEASURING SCAN HEAD AND ITS USE METHOD

METHOD TECHNICAL FIELD OF THE INVENTION

The invention relates to technical field of computer. To be specific, it includes a temperature-measuring scan head and its use method.

BACKGROUND OF THE INVENTION

As mobile internet and its terminals are developing flourishingly, scan decoding technology is widely used in various industries, including logistics, retail, warehousing, medical service and livestock raising. However, some shortcomings of the existing scan heads are exposed.

Among the current 2D scan head schemes, all of them provide very simple functions, namely, to decode one-dimensional or two-dimensional barcodes only. As mobile IoT technologies are deeply explored in various industries, customers have high requirements on the existing scan heads. That includes not only improved working speed and stability, but also functional diversity. For example, current body temperature of a patient should be measured in medical industry. This refers to temperature of animals in animal husbandry so as to prevent diseases. Even for fire prevention of warehouse, overheat of equipment, and cold-chain storage and transportation, temperature information is necessary. However, the existing scan heads are unable to meet this function.

DETAILED DESCRIPTION OF THE INVENTION

This invention is to provide a temperature-measuring scan head and its use method. Except for decoding one-dimensional and two-dimensional barcodes that the existing scan heads do, the present scan head is able to measure temperature with precision. That helps match temperature of the measured objects or human things with their respective identity. It solves the problem mentioned against the background aforesaid.

In order to achieve the purpose aforesaid, the invention presents a technical proposal as follows: a temperature-measuring scan head, comprising an enclosure. The enclosure has supplementary lamp, image sensor and temperature sensor at its end face. There are 2 groups of the supplementary lamps, each being installed at the ends of the enclosure. Between these two groups are the image sensor and the temperature sensor arranged in order. The terminals of both image sensor and temperature sensor are electrically connected to the central processing unit via wires. The supplementary lamp, image sensor and temperature sensor are electrically provided with control switch.

The steps of using the present temperature-measuring scan head are given below:
Step 1: Turn on supplementary lamp and image sensor via the control switch;
Step 2: Align the present scan head with barcode of objects or living things to be measured;
Step 3: Turn off image sensor and then supplementary lamp via the control switch;
Step 4: Turn on temperature sensor via the control switch;
Step 5: Collect and process data via the central processing unit, and send data to the upper computer for saving.

In the Step 5 above, the upper computer is a computer that is electronically connected to the present scan head via wires, and the central processing unit is inside the computer.

Preferably, the supplementary lamp, image sensor and temperature sensor are all controlled by control switch on which there are three groups of buttons that control the working status of supplementary lamp, image sensor and temperature sensor respectively.

Preferably, there is a temperature-calibration module inside the temperature sensor.

Compared with the existing technologies, the present invention stands out for the temperature-measuring scan head and its use method. The present scan head is as small as the existing scan heads on the market, but it has high-precision temperature sensor with built-in temperature-calibration module that promises temperature information collection and accurate temperature measurement. Therefore, the application of the present temperature-measuring scan head is employed in a wider range of industries. Current body temperature of a patient should be measured in medical industry. This refers to temperature of animals in animal husbandry so as to prevent diseases. Even for fire prevention of warehouse, overheat of equipment, cold-chain storage and transportation, temperature information is necessary. The present scan head can do this. Technically, the operator should use the present scan head to scan the barcode of the measured objects or living things, and the present scan head will read identity information and conduct temperature measurement. As such, temperature of the measured objects or living things corresponds to their respective identity, thereby guaranteeing the accuracy of data.

EMBODIMENTS OF THE INVENTION

This part, in line with the drawings included in the embodiments of the invention, describes the technical proposal of the invention in detail and completely. Obviously, the embodiments described herein are not exhaustive. Based on the embodiments of the invention, all others that are made by ordinary technicians in the art not creatively shall be subject to the protection of the invention.

Figure 1:
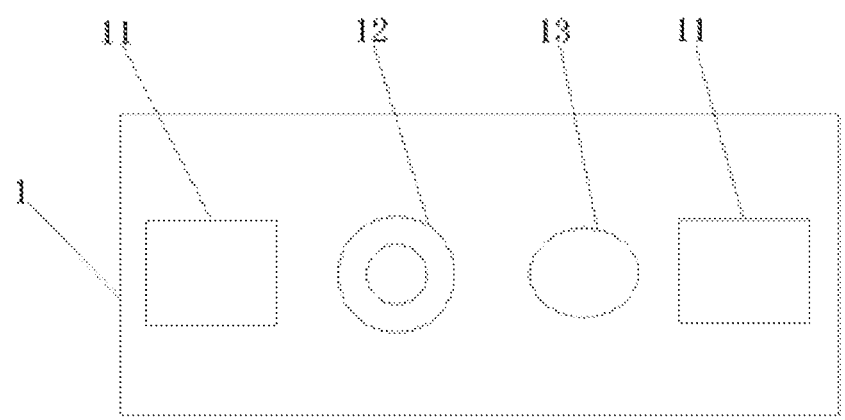
FIG. 1 shows an illustration of the invention.
Figure 2:
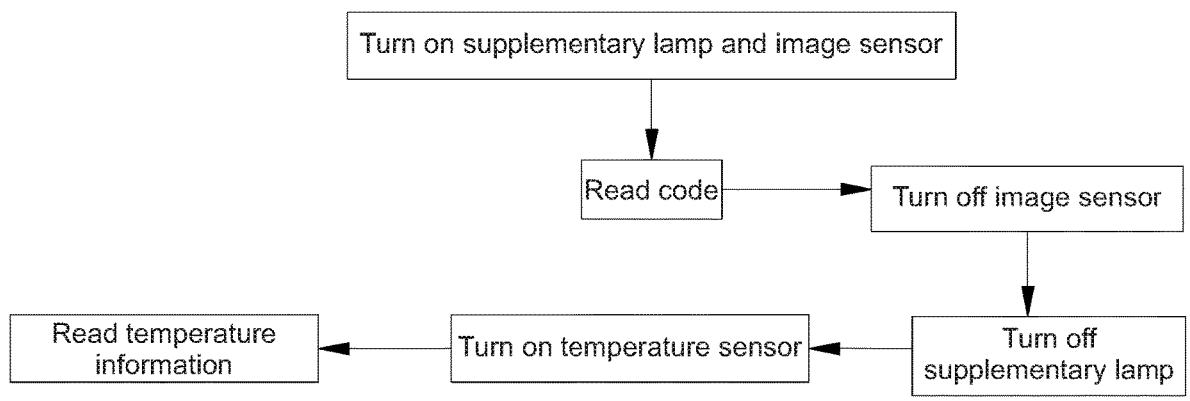
FIG. 2 shows a work flowchart of the invention where: 1 enclosure; 11 supplementary lamp; 12 image sensor; 13 temperature sensor.

With reference to FIG. 1-2, the invention presents a technical proposal: a temperature-measuring scan head, comprising enclosure 1. The enclosure 1 has supplementary lamp 11, image sensor 12 and temperature sensor 13 at its end face. There are 2 groups of the supplementary lamps 11, each being installed at the ends of the enclosure 1, for the purpose of adding lightness when the present scan head scans the objects to be measured. Between these two groups are the image sensor 12 and the temperature sensor 13 arranged in order. The former is able to decode one-dimensional or two-dimensional barcodes. Different from the general temperature sensors, the latter, which features small size and ultra-low power consumption, has built-in temperature-calibration module. These endow itself accurate temperature measurement and information collection up to medical level. The terminals of both image sensor 12 and temperature sensor 13 are electrically connected to the central processing unit via wires. The supplementary lamp 11, image sensor 12 and temperature sensor 13 are electrically provided with control switches. They are all controlled by control switch on which there are three groups of buttons that control the working status of supplementary lamp 11, image sensor 12 and temperature sensor 13 respectively.

The steps of using the present temperature-measuring scan head are given below:

Step 1: Turn on supplementary lamp 11 and image sensor 12 via control switch. The former adds lightness when the scan head is scanning barcode of the objects or living things to be measured. That helps obtain an accurate measurement.

Step 2: Align the present scan head with barcode of the objects or living things to be measured. The image sensor 12 is responsible for collecting images and transferring information to the central processing unit which reads the code.

Step 3: Turn off image sensor 12 and then supplementary lamp 11 via the control switch after code access, to make preparations for next temperature measurement. That prevents heat dissipation of the supplementary lamp 11 from affecting the accuracy of data measured by the temperature sensor 13.

Step 4: Turn on temperature sensor 13 via the control switch to measure temperature. That helps match temperature of the measured objects or human things with their respective identity.

Step 5: Collect and process data via the central processing unit, and send data to the upper computer for saving. The upper computer is a computer that is electronically connected to the present scan head via wires, and the central processing unit is inside the computer which can save image and temperature information. All these efforts improve the accuracy of data measured by the present temperature-measuring scan head.

To sum up, the invention covers the present temperature-measuring scan head and its use methods. The present scan head is as small as the existing scan heads on the market, but it has high-precision temperature sensor 13 with built-in temperature-calibration module that promises temperature information collection and accurate temperature measurement. Therefore, the application of the present temperature-measuring scan head is employed in a wider range of industries. Current body temperature of a patient should be measured in medical industry. This refers to temperature of animals in animal husbandry so as to prevent diseases. Even for fire prevention of warehouse, overheat of equipment, and cold-chain storage and transportation, temperature information is necessary. The present scan head can do this. Technically, the operator should use the present scan head to scan the barcode of the measured objects or living things, and the present scan head will read identity information and conduct temperature measurement. As such, temperature of the measured objects or living things corresponds to their respective identity, thereby guaranteeing the accuracy of data.

The foregoing is the preferred embodiments of the invention. It is intended that the scope of the invention is not limited to this foregoing description, but includes equivalent substitutions or variations of the present invention made by those skilled in the art without departing from the scope or spirit of the invention.

What is claimed is:

1. A temperature-measuring scan head, comprising an enclosure, is characterized in that: the enclosure (1) includes two supplementary lamps (11), an image sensor (12) and a temperature sensor (13) at its end face, wherein the two supplementary lamps (11), each being installed at the ends of the enclosure (1), the image sensor (12) and the temperature sensor (13) are arranged in order between the two supplementary lamps, wherein terminals of both image sensor (12) and temperature sensor (13) are electrically connected to the central processing unit via wires and the two supplementary lamps (11), image sensor (12) and temperature sensor (13) are electrically provided with control switches and wherein the two supplementary lamps (11), image sensor (12) and temperature sensor (13) are all controlled by control switches on which there are three groups of buttons that control the working status of the two supplementary lamps (11), image sensor (12) and temperature sensor (13), respectively.

2. The temperature-measuring scan head according to claim 1, further comprising a temperature-calibration module inside the temperature sensor (13).

3. A method of using a temperature-measuring scan head comprising turning on the two supplementary lamps (11) and image sensor (12) via the control switch; aligning the present scan head with barcode of objects or living things to be measured; turning off image sensor (12) and then the two supplementary lamps (11) via the control switch; turning on temperature sensor (13) via the control switch; collecting and processing data via the central processing unit, and sending data to the upper computer for saving, wherein the upper computer is a computer that is electronically connected to the present scan head via wires, and the central processing unit is inside the computer.

* * * * *